Figure 1:
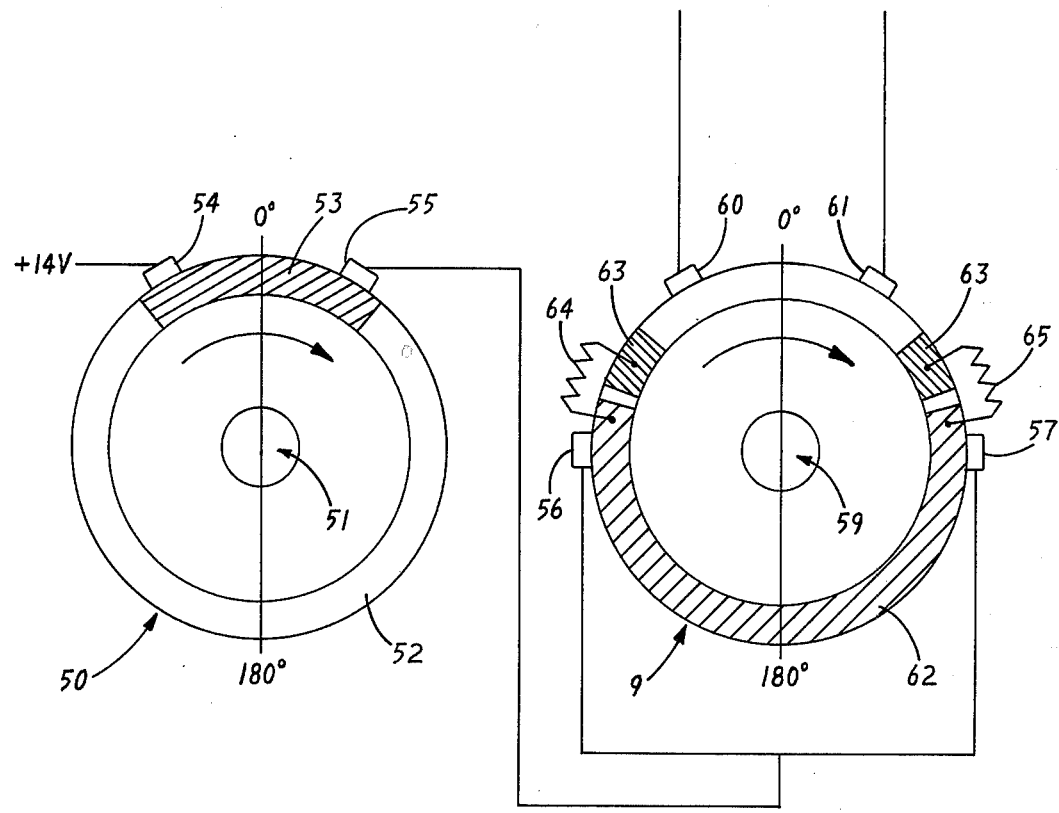

United States Patent [19]

Reas

[11] 3,984,986
[45] Oct. 12, 1976

[54] CONTROL SYSTEM FOR SYNCHRONIZING ENGINES

[76] Inventor: Arley J. Reas, 1102 Lenox St., Piqua, Ohio 45356

[22] Filed: Mar. 25, 1974

[21] Appl. No.: 454,752

[52] U.S. Cl. .............................................. 60/702
[51] Int. Cl.² .......................................... F01B 21/00
[58] Field of Search ..................... 60/700, 702, 704; 74/857

[56] References Cited
UNITED STATES PATENTS

| | | | |
|---|---|---|---|
| 2,501,228 | 3/1950 | Light | 60/704 X |
| 2,670,157 | 2/1954 | Peterson | 60/702 X |
| 2,847,617 | 8/1958 | Clark, Jr. | 60/700 X |
| 3,024,610 | 3/1962 | Ulman | 60/704 X |
| 3,048,743 | 8/1962 | Chillson | 60/700 X |
| 3,086,154 | 4/1963 | Lowther et al. | 60/704 X |

FOREIGN PATENTS OR APPLICATIONS

| | | | |
|---|---|---|---|
| 931,389 | 2/1948 | France | 60/700 |

Primary Examiner—Alan Cohan
Attorney, Agent, or Firm—Jerome P. Bloom

[57] ABSTRACT

A control system for insuring synchronized operation of engines, such as those in a propeller driven aircraft, wherein a master engine dictates the speed and phase condition of a slave engine. The system features a timing generator in connection with the master engine and a speed detector in connection with the slave engine which are interrelated to produce a direct and accurate signal of an overspeed or underspeed, out of phase, condition of the slave engine, when such occurs. This signal is directed through an amplifier computer portion of the control system which embodies a unique dual servo arrangement for selectively routing the signal through different output channels. Low level outputs are modulated for a "soft" correcting influence. In any case, the output of the computer amplifier portion of the control system is directed to provide a representative current value in the windings of an electromagnet embodies in an improved governor operatively related to the slave engine. The level of the current induced in the windings is reflected by an appropriate adjustment of the operating condition of the slave engine.

21 Claims, 4 Drawing Figures

CONTROL SYSTEM FOR SYNCHRONIZING ENGINES

BACKGROUND OF THE INVENTION

This invention relates to improvements in control systems for maintaining a plurality of engines in a synchronized condition and more particularly to a system for speed and phase control. It has particular advantage for use in propeller driven aircraft which employ multiple engines and will be so described, though obviously not so limited in application. Invention embodiments feature a unique signalling arrangement, an improved amplifier computer and an improved governor. Their combination is such to provide a system for inducing a slave engine to operate in phase and in synchronization with a master engine which is more effective, safer and more comfortable to use, particularly in application to aircraft engines in propeller driven aircraft.

As employed in propeller driven aircraft, for example, the prior art systems have reflected many undesirable features due to the lack of balance or sensitivity evidenced in their control components. This lack of balance and sensitivity can and has caused hunting in the servo systems employed and oftentime has necessitated major control action on the part of a pilot, with consequent discomfort and even danger to the occupants of an aircraft.

While there are many systems for governing and synchronizing engines, it nevertheless remains that there has been an absence in the prior art of a system wherein the effect of undesired factors or signals have been properly minimized or cancelled out.

The present invention is directed to a solution of the above noted problems.

Examples of the patents revealing a state of the prior art are found in U.S. Pat. Nos. 3,689,175 and 3,751,993.

SUMMARY OF THE INVENTION:

The present invention contemplates a control system for engines wherein a master engine dictates the speed and phase condition of a slave engine. A timing generator operatively related to the master engine has a time-phase relation to a speed detector operatively related to the slave engine. The timing generator and the speed detector are so connected as to produce an electrical output in the form of a direct and accurate signal of an out of phase, overspeed or underspeed of the slave engine, when such occurs. Means are included in the speed detector to modify or soften the nature and character of the output signal when the departure from synchronism by the slave engine is relatively small.

In accordance with the invention practice the output signal indicative of an out of synchronism condition of the slave engine is routed to a computer type amplifier forming part of a novel control system, under the influence of timing pulses which originate in the timing generator.

The computer amplifier is so arranged as to inhibit undesired signals from affecting its prime responsibility. It features dual phase and speed servos which discriminate between low and high levels of departure from synchronism by the slave engine. The response and balance of the amplifier is such to obviate hunting of its servo elements in establishing the proper output necessary for correcting the signalled error. The output of the computer amplifier is applied to a governor which also embodies improvements of the present invention.

The governor employed includes an electromagnet control unit to which the speed servo of the computer amplifier applies a reference current value at all times. If a substantial departure from synchronism by the slave engine should occur, the speed servo will function in response thereto. However, if the departure from synchronization is relatively small or of a low level, the signal thereof to the speed servo will be blocked. In such case the signal will be routed through the phase servo of the amplifier. The arrangement is such to modulate the output of the amplifier where the signalled departure from synchronism is of a low level nature. In any case, the computer amplifier will respond immediately and firmly to a signal that the condition of operation of the slave engine is such that it is out of phase with and operating at a speed that is different from that of the master engine. The response of the amplifier will be reflected by an increase or decrease of the current value applied thereby in the electromagnet control unit of the aforementioned governor. As wil be described, in the illustrated application to a propeller driven aircraft, this change in current value will be applied to flyweights driven from the slave engine in a manner to cause a change in the pitch of the propeller blade driven by the slave engine. In this manner any overspeed or underspeed and out of phase condition of the slave engine is gently and firmly corrected.

A primary object of the invention is to provide a control system for causing a slave engine to follow the operation of a master engine in respect to its speed and phase conditions which is economical to fabricate, more efficient and satisfactory in use and adaptable to a wide variety of applications.

An additional object of the invention is to provide improved means for correcting an out of phase condition of a slave engine in reference to a master engine which affords quicker and more effective control signals.

Another object of the invention is to provide, in a control system for maintaining a synchronized condition of a master and a slave engine, an amplifier computer arrangement which receives and distinguishes signals of speed and phase differences existing in the slave engine by the level or degree thereof and routes said signals to an output station accordingly.

Another object of the invention is to provide, in a system for correcting a speed and phase difference of a slave engine with reference to a master engine, a timing generator and a speed detector which are so interrelated to differentiate and transmit overspeed and underspeed signals and include means in connection therewith to modify those signals of lesser value.

Another object of the invention is to employ, in a control system for maintaining a synchronized condition of a master and a slave engine, an amplifier computer arrangement including channels which discriminate and selectively route signals indicating an out of synchronism condition of the slave engine in accordance with the nature thereof.

A further object of the invention is to provide improvements in governors for engines.

Another object of the invention is to provide an improved control system for use in causing a slave engine to follow the operation of a master engine, as to its speed and phase, possessing the advantageous structural elements, the inherent meritorious characteristics and the means and mode of use herein described.

With these and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 2:
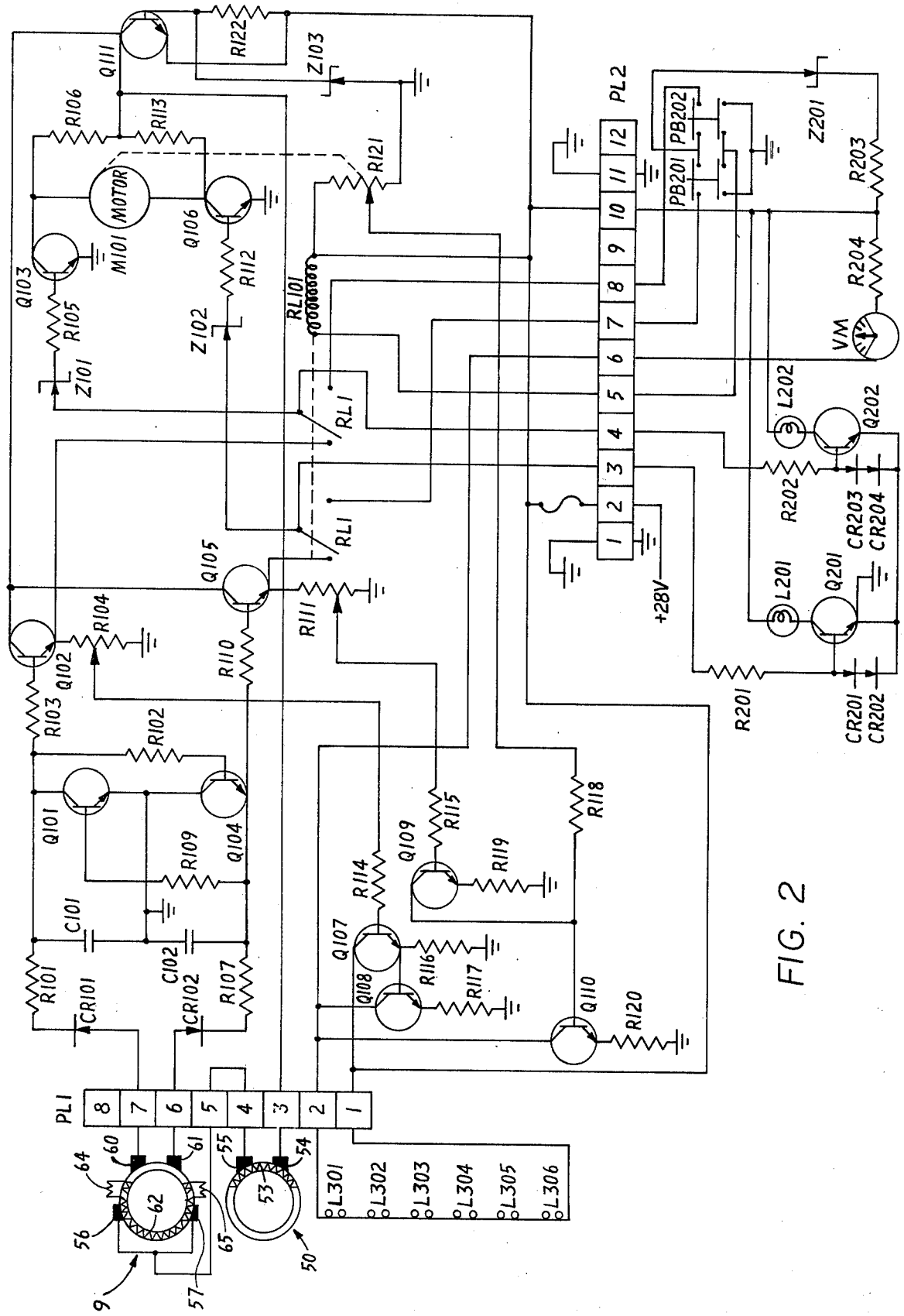
Figure 3:
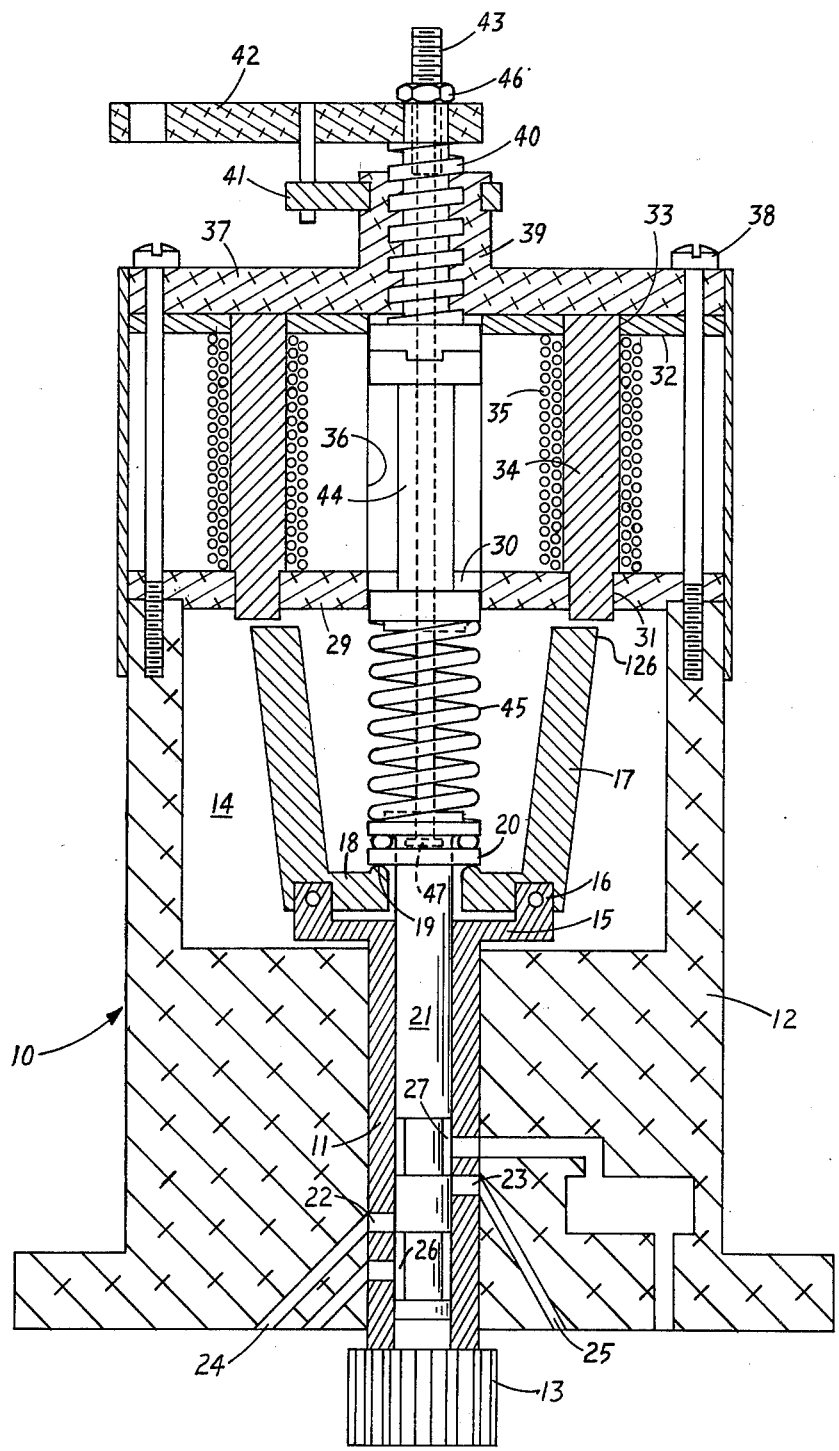
Figure 4:
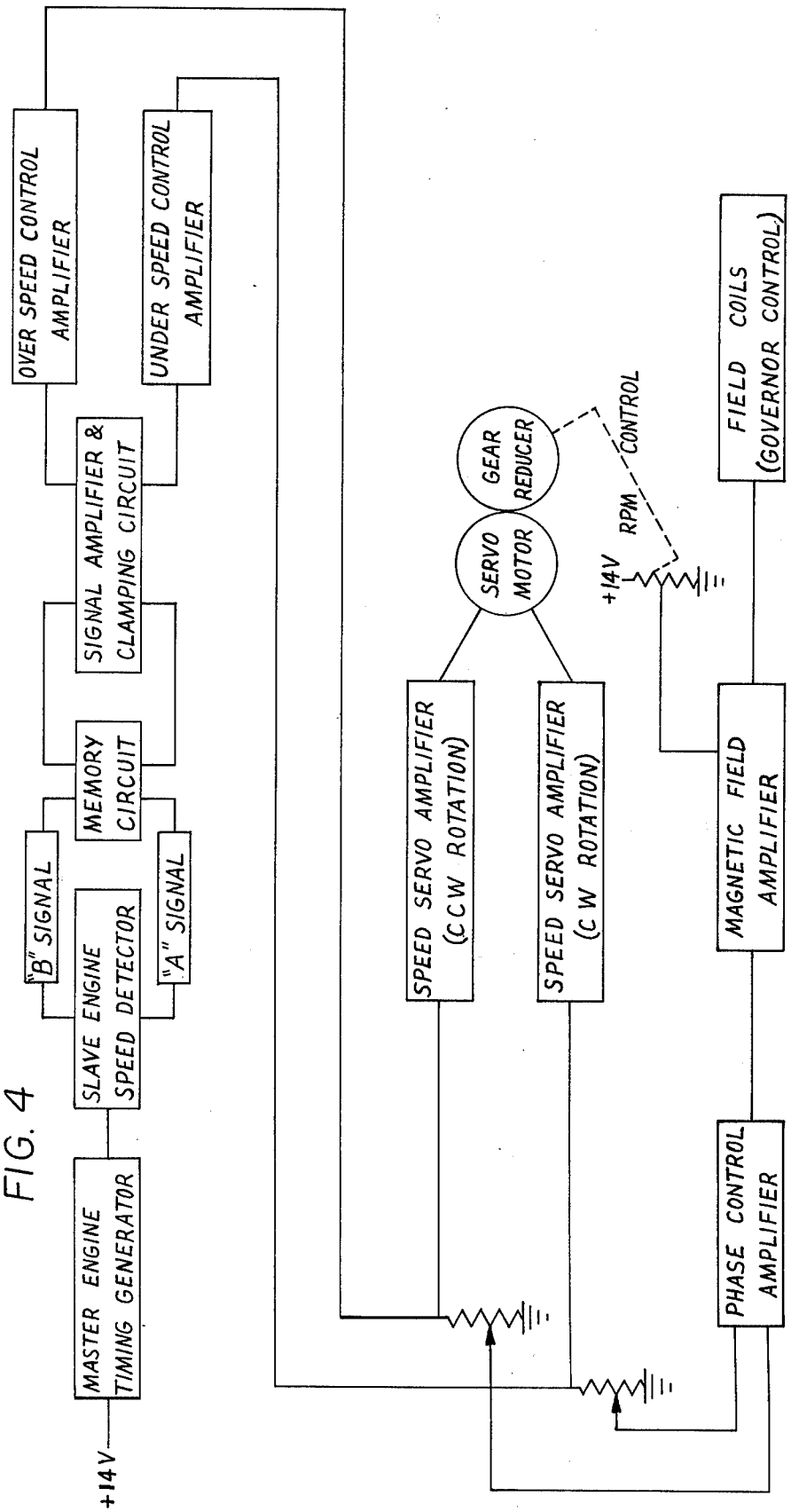

Referring to the drawings wherein is shown one but not necessarily the only form of embodiment of the invention, FIG. 1 is a schematic showing of an operative connection between a master and a slave engine, in a preferred embodiment of the invention, achieved through the medium of a timing generator connected to the master engine and a speed detector connected to the slave engine;

FIG. 2 includes a schematic showing of a computer amplifier portion of a control system in accordance with the present invention;

FIG. 3 is a sectional view illustrating an improved governor which is utilized in the control system of the invention; and FIG. 4 is a block-type schematic diagram which further illustrates a control system in accordance with the present invention.

Like parts are indicated by similar characters of reference throughout the several views.

By way of example, but not by way of limitation, the various improved elements of the present invention are here illustrated in reference to a control system for insuring the synchronized operation of a master and a slave engine embodied in a propeller driven aircraft.

Referring to FIG. 3 of the drawings, preferred embodiments of the control system of the invention include a governor 10 embodying a tubular shaft 11 which bears for rotation in the base of a cup-shaped end portion 12 of the governor housing. Fixed to the outermost end of the shaft 11 is a gear 13. By means not shown, the gear 13 is placed in connection with and normally driven by and in correspondence with the speed of the slave engine. The innermost end of the shaft 11, which disposes within the housing portion 12, immediately adjacent the base thereof, mounts a series of radially projected, circumferentially spaced fingers 15, the outer ends of which have right angled projections 16. The projections 16 extend about and generally parallel to the central longitudinally extending axis of the governor and each pivotally mounts an angularly formed flyweight 17. Each flyweight 17 includes relatively angled arm portions which define therebetween an angle which is slightly greater than 90°. As seen in FIG. 3, in a balanced condition of the governor, the shorter arm portion 18 of each of the flyweights 17 is directed radially inward of the governor housing in a generally parallel relation to an underlying finger 15. Each arm portion 18 has a knob-like projection 19 positioned to underly a radial annular flange 20 formed externally of the inner end of a valve rod 21. The rod 21, in the main, is housed within and bears on the inner wall of the tubular shaft 11. It should be noted that the end of the tube 11 adjacent the gear 13 is closed and the wall of the shaft 11 is provided with circumferentially and longitudinally spaced passages 22 and 23. Passages 24 and 25 are formed in the base of the housing portion 16 to respectively communicate at their inner ends with the passages 22 and 23 in the shaft 11.

The outer ends of the passages 24 and 25, in a system such as here described, will be coupled into a flow system leading from a source of hydraulic fluid under pressure to a hydraulic servo system provided for adjusting the pitch of a propeller blade in connection with and driven by the slave engine. As will be obvious, the valve rod 21 is suitably grooved on its outer surface, as indicated at 26 and 27, for example, so that upon a longitudinal adjustment thereof, depending on the direction and degree, the condition of the hydraulic fluid as applied in the hydraulic servo system for the propeller blade may be suitably and automatically dictated in correspondence with a signal to the governor 10 that the slave engine is not in phase or in synchronization with the master engine embodied in the aircraft. The manner of achieving this objective will become clear from the following description.

Superposed to cap the chamber 14 defined by the housing portion 12 is an aluminum plate 29 having a central aperture 30. The plate 29, which may for that matter be of any non-conductive material, includes a series of six apertures 31 which are equidistantly and circularly spaced from each other and radially and equidistantly spaced from the aperture 30. As may be seen in FIG. 3, the plate 29 forms the lower segment of an electromagnet type control unit the upper segment of which is provided by an iron plate 32 which is spaced vertically above the plate 29 and includes a series of apertures 33 which are in alignment with the apertures 31 in the plate 29. Bridging the plates 29 and 32 are a series of pole pieces 34. In the case of each of the pole pieces 34, one end of the pole piece is thrust through an aperture 31 in the plate 29 to project slightly inwardly of the chamber 14 while the other end is positioned in an axially aligned aperture 33. Between the plates 29 and 32 each of the pole pieces form the base about which is wound an electromagnet winding 35. The windings 35 are so arranged to define a central passage 36 in the electromagnet control unit which is in direct alignment with the central apertures in the plates 29 and 32. The plate 32 is capped, in turn, by an annular plate 37 which contains the electromagnet control unit in a capping relation to the housing portion 16 as bolts 38 are thrust therethrough and through aligned openings in the plates 32 and 29 to threadedly engage in the upper end of the wall defined by the cup-shaped housing portion 16. Formed integral with the plate 37 and projecting from its outermost surface, about its central aperture, is a tube-like structure 39 the inner wall of which is threaded and threadedly engaged by a control rod 40. One end of the control rod 40 projects outwardly of the tube structure 39 and is coupled to a radially oriented, integrally connected, control arm 41. The arm 41 is in turn coupled to a superposed control lever 42. The latter is connected by suitable means, not shown, to the controls available for manual manipulation and adjustment of the governor by a pilot in the aircraft in which the invention control system is incorporated.

A feather control rod 43 is projected through aligned apertures in the inner end of the lever 42 and the arm 41, a central passage in the rod 40 and a coupled tube 44 which forms an extension of the rod 40, and through a coil-type speed control spring 45 to anchor at its innermost end by threaded engagement in the expanded head portion of the valve rod 21 which includes the flange 20. The outer end of the feather control rod is threadedly engaged by a nut 46, the adjustment of which produces a selected compression of or load on the spring 45 which is positioned between an expanded outer end portion of the tube 44 which forms an extension of the tube 40 and head of the valve rod 21. The head of the rod 21 has a central projection 47 about which is positioned the abutted end of the spring 45. The spring is both seated and centered thereby.

The governor above described will function and be controlled in a manner dictated by the related control system. The connected control system is responsive to a signal having its source in a timing generator 50 connected to and driven by a master engine (not shown). The drive is through the medium of a shaft 51 and transmitted by the shaft to a slip ring 52, a limited segment 53 of which is conductive. the arcuate extent of the conductive segment 53 will be determined in accordance with the application of the invention system. Positioned in peripheral contact with the ring 52 are a pair of circumferentially spaced brushes 54 and 55. The brushes are so spaced that both will contact the conductive segment 53 for a selected number of degrees of each cycle of rotation of the shaft 51.

The brush 54 is connected with a source of power which applies thereto a regulated 14 volts DC. The brush 55 is electrically connected with a pair of brushes 56 and 57 positioned 180° apart and in peripheral contact with a slip ring 58 driven through the medium of a shaft 59 which is driven in turn by the slave engine, through means and in a manner not here shown. Positioned between the brushes 56 and 57, circumferentially spaced, and also in contact with the slip ring 58 are a pair of output brushes 60 and 61. The slip ring 58 includes a conductive segment 62 the arcuate extent of which is greater than 180°. Immediately beyond the respective ends of the conductive segment 62, and insulated therefrom, are further conductive segments 63. In the embodiment illustrated, each of the segments 63 have an arcuate extent of 11° and are connected to the adjacent end of the segment 62 by a resistor, in the one case by a resistor 64 and in the other by a resistor 65. The composite of the elements 56 through 65 form a speed detector which together with the timing generator 50 will function to produce an appropriate signal of an out of phase underspeed or overspeed condition of the slave engine with reference to the master engine.

It is to be noted that in the speed detector the brushes 56 and 57 are so positioned as to assure a conductive connection of the timing generator with the conductive segment 62 of the slip ring 58 in all positions of rotation of the shaft 59.

The brushes 60 and 61 respectively serve to signal an out of phase overspeed or underspeed condition of the slave engine, as referenced to the master engine, when such occurs. They are so positioned that at the time of a timing pulse from the generator 50 they will be in contact with the non-conductive portion of the slip ring 62 as long as master and slave engines are operating in synchronism.

In operation of the timing generator, during the period the segment 53 of the slip ring 52 contacts both the brush 54 and the brush 55 in each cycle of rotation of the shaft 51, a timing pulse will be present at the brush 55 which is transmitted through appropriate electrical wiring to the brushes 56 and 57 of the speed detector. If the master and slave engines are operating in synchronism at the time of a pulse, brushes 60 and 61 will both be in contact with the non-conductive portion of the slip ring 58. In such case no transmission of this pulse is possible, either by way of the brush 60 or the brush 61. The occurrence of this pulse will therefore have no effect on the system operation. In the event, however, the slave engine should overspeed, for example, slip ring 58 will, at the time of a pulse from the brush 55, be advanced clockwise relative the slip ring 52. Depending on the degree of overspeed this will place a conductive segment 63 or a portion of the segment 62 of the ring 58 in contact with the brush 60. This provides a path through which the timing pulse may be directed to provide an output signal at the brush 60. This output signal will, of course, indicate the slave engine is operating in an out of phase condition with respect to the master engine and at a higher speed and have an amplitude the level of which is dictated by the degree of displacement of the ring 58 relative to the ring 52. Similarly, if the speed of the slave engine should fall below that of the master engine, the slip ring 58 will at the time of a pulse from the timing generator 50 be displaced counterclockwise with reference to the slip ring 52. This will place the opposite conductive segment 63 or an opposite end portion of segment 62 in contact with the brush 61. If this occurs, a path is completed to deliver the timing pulse from the brush 55, by way of the brush 57, to appear as an output at the brush 61. Accordingly, the signal appearing as an output at the brush 61 will represent an indication that the slave engine is operating at a lower speed and out of phase with the master engine to a degree dependent on the position of displacement of the slip ring 58 with reference to the slip ring 52 at the time of pulse transmission, and having a corresponding amplitude.

In the event an overspeed or underspeed out of phase condition should be represented by a signal appearing at either the brush 60 or 61, the same will be directed to an appropriate channel of a related computer amplifier such as illustrated in FIG. 2 of the drawings.

Particular attention is directed to the face that the segments 63 of the slip ring 58 which are connected by resistors to the segment 62 are so arranged to enable a modulation of the level of the signal directed to and through the computer amplifier when the speed and phase deviation of the slave engine from synchronism with the master engine is small. As will be seen, this permits a "softer" corrective action on the slave engine and a considerably improved control condition in correcting the slave engine wherein there is an absence of "hunting" as is so prevalent in systems of the prior art applied to similar purposes.

Referring to FIG. 2 of the drawings, an overspeed signal emanating from brush 60 will move to the overspeed channel of the computer amplifier of the invention system. This signal will pass through a diode CR101 and a resistor R101 to charge a capacitor C101. The latter serves as a storage capacitor which functions to inform the servo amplifiers in the system that servo correction must be effected and maintained until another timing pulse is routed to the computer amplifier. Timing pulses indicative of the overspeed condition signalled will continue to charge CR101 until the overspeed condition is corrected. A portion of the signal directed to charge the capacitor CR101 will pass through the resistor R102 to forward bias the resistor Q104 and clamp all signals that may appear in the underspeed channel of the computer amplifier, for any reason whatsoever, to ground, until the overspeed condition signalled is corrected.

The overspeed signal will further operate to bias transistor Q102 into a conductive state and thereby develop a control signal across its emitter follower resistor R104. The resistor R104 forms part of a potentiometer the follower arm of which picks off a signal for the phase control servo embodied in the computer amplifier. Simultaneously a signal for the speed control servo is taken off the junction of the emitter of transistor Q102 and the resistor R104. In the line from this junction which incorporates, in series, a switch RL1, a Zener diode Z101, a resistor R105 and a transistor Q103, leading to a servo motor M101, the Zener diode Z101 blocks the passage of the low voltage signals which are indicative of a low level of overspeed or out of phase condition of the slave engine. In the case illustrated it will block all signals resulting from an out of phase condition that is 11° or less. The low voltage signal which is blocked by the Zener diode Z101 from reaching the speed servo is picked off from the resistor R104 by the follower arm of the potentiometer of which it forms a part. This picked off signal is directed through the resistor R114 to bias series related transistors Q107 and Q108 into a conductive state. These transistors are series related with the six windings in the governor 10. The result of this routing and amplification of the low level out of phase signal is to cause an increase in the current flow in the windings 35. This increase is referenced to an original current value applied in the windings by an original setting of the speed servo means in the computer amplifier.

Accordingly, when the current in the governor coils 35 is increased in correspondence with the low level overspeed condition that exists, an increased magnetic bias will be applied by the pole pieces of the electromagnet control unit to the tips of the flyweight arm portions 26. It is noted that in the synchronized condition of the master and the slave engine these tips will position directly under the ends of the pole pieces 34 which project from the plate 29. In this position the flyweight arms 26 slightly diverge from lines parallel to the central axis of the governor housing. The increase in the electrical coil current will bias the flyweight tips outward to simulate an increase in the speed of the slave engine. This action is reflected by a resultant pivoting movement of the arm portions 18 of the flyweights 17 against the flange 20, providing for a displacement of valve rod 21 from its null position of FIG. 3 and outwardly of the tubular shaft 11 against the influence of the spring 45 which has previously been placed under a degree of compression. The shift of the valve rod 21 will in a conventional manner operate to cause the hydraulic servo related to the propeller blade driven by the slave engine to function to increase the pitch of the propeller blade in a manner to place a load on the slave engine which reduces its speed to a degree indicated as required by the out of phase overspeed signal.

If the out of phase overspeed condition signalled from the speed detector brush 60 should be of an amplitude corresponding to an out of phase condition exceeding 11°, the corresponding voltage developed in the overspeed channel of the computer amplifier will be sufficiently high to bias the Zener diode Z101 into a conductive state. There is produced thereby a forward bias of the transistor Z103, placing it in a conductive state which causes the servo motor M101 to operate and drive through suitable means, the potentiometer represented by the resistance R121, to cause it to increase its reference bias to the transistor Q110. This is achieved by a pick off of this signal by the arm of the potentiometer embodying the resistor R121. As was mentioned previously, a reference bias is originally established in the windings 35 by an appropriate setting of the speed servo means of the computer amplifier of the invention system. It will be seen from FIG. 2 of the drawings that as the reference bias to the transistor Q110 is increased, the conduction of Q110 is correspondingly increased, as is the current value in the governor control coils or winding 35, to the extent necessary to correct the overspeed condition of the slave engine. It will be self-evident that this overspeed condition will be corrected by an increase in the degree of bias produced on the outer tips of the arms 26 of the flyweight 17. The resultingly induced shift of the valve rod 21 will serve to adjust the condition of the hydraulic servo which controls the pitch of the propeller blade driven by the slave engine. By appropriate increase of the blade pitch, thus achieved, correction of the out of phase overspeed condition of the slave engine is immediately and positively achieved.

If a signal indicative of an out of phase underspeed condition of the slave engine should appear at the brush 61, in correspondence with a shift of the slip ring 58 with reference to the slip ring 52, such signal will be directed through the underspeed channel of the computer amplifier. If the signal indicates a low level out of phase underspeed condition, its flow will be through the line including the diode CR102 and resistor R107 to charge the capacitor C102. As in the case of the capacitor C101, the capacitor C102 supplies memory to the appropriate servo amplifier to maintain servo control until another timing pulse is detected. Timing pulses indicative of underspeed will continue to charge the capacitor C102 until the underspeed condition is corrected. Likewise a portion of this underspeed signal stored in the capacitor C102 is routed through a resistor R109 to apply a forward bias on the transistor Q101 to clamp any signal that may appear in the overspeed channel, during the correction of the underspeed condition, to ground.

As may be seen, it is a feature of the amplifier computer portion of the invention system that the first occurring signal indicating the need for correction of the operating condition of the slave engine will be permitted to exercise its corrective influence without interference by, or cancellation thereof by, extraneous signals. This inhibits the occurrence of hunting conditions in the corrective action by the invention control system.

The underspeed signal as applied in the underspeed channel of the computer amplifier will be routed through the resistor R110 to bias the transistor Q105 into a conductive state and thereby develop a control signal across its emitter follower resistor R111 which forms part of a potentiometer. Signals for the phase control servo in the underspeed channel are taken from the arm of the potentiometer. Signals for the speed control servo in the underspeed channel of the amplifier are taken from the junction of the resistor R111 and the emitter of the transistor Q105. A line related to the speed control servo leading from the junction of the resistor R107 and emitter of transistor Q105 incorporates, in series relation, the switch RL1, a Zener diode Z102, a resistor 112 and a transistor Q106 and leads to the servo motor M101. If the underspeed signal is of low value, indicated in the example illustrated by an out of phase condition of the slave engine of 11° or less, it will provide insufficient voltage to pass the Zener diode. However, the phase control servo, in this instance also, reacts to the low voltage signals and serves to control most out of synchronism conditions. Thus, the low level signal appearing at the resistor R111 is picked off by the arm of the potentiometer of which it forms a part and routed through a resistor R115 to bias the transistor Q109 into a conductive state, the result of which is to drain some of the reference bias originally applied to the transistor Q110 by the basic setting of the speed servo means. This action will, as may be seen from FIG. 2 of the drawings, cause a reduction in the current value which exists in the windings 35 in the governor 10. Correspondingly, there will be a reduction in the magnetic bias applied to the outer tips of the flyweights 17 through the pole pieces 34. The resulting reduction of the pull on the flyweights will permit the speeder spring 45 to apply a bias to pull the flyweights inwardly and cause a shift of the valve rod 21 inwardly of shaft 11. The inward movement of rod 21 will provide a path for flow of hydraulic fluid thereby under pressure to operate the related hydraulic servo to effect a decrease in the pitch of the propeller driven by the slave engine. As a result of the precision of the corrective signal applied to the valve rod, the slave engine will automatically increase its speed and come into phase with the master engine.

If the out of phase underspeed signal directed to the underspeed channel of the computer amplifier corresponds to a displacement of the slip ring 58 relative the slip ring 52 in excess of 11°, then the signal will be handled by the speed servo. Such a signal will have an amplitude to apply a voltage in the line leading from the junction of the resistor R111 and the emitter of the transistor Q105 sufficient to pass the Zener diode 102 and induce a bias of the transistor Q106 into a conductive state causing the motor M101 to operate. In this case the operation of the motor M101 is in a sense to adjust the potentiometer embodying the resistor 121 to lower its reference bias on the transistor Q110 to the degree of the out of phase underspeed condition indicated. This adjustment will correspondingly decrease the current value in the windings 35 in the governor 10 as well as the magnetic bias which is applied through the pole pieces 34 on the outer tips of the flyweights 17. There will be a corresponding adjustment of the position of the valve rod 21 in a manner believed obvious and correspondingly an adjustment of the hydraulic servo controlling the pitch of the propeller blade driven by the slave engine. The pitch will be decreased to decrease the load on the slave engine sufficiently to enable it to speed up and achieve an in phase synchronized condition with respect to the operation of the master engine.

In accordance with the improvements in the computer amplifier segment of the invention control system hunting of servo controls due to overcorrection is inhibited by the application of double acting phase and speed servos as here employed. The application of corrections by the system is firm, gentle and positive in nature. As seen, the speed servo means of the system which commonly serves the underspeed and the overspeed channels of the computer amplifier is initially set to establish a reference current value in windings 35 in the governor 10 and reacts and functions only in response to signals of significant out of phase underspeed or overspeed conditions of the slave engine. On the other hand, the phase servos in the respective channels react to low level signals and function to make corrections in response thereto without exciting the speed servo. It is to be understood that in any instance of error, small or large, the phase servo functions and will function and, in a combined action with the speed servo, will anticipate for the speed servo action in a manner to provide an overall system stability and an elimination of over control and hunting in the servo operation. The net result is to provide in the control system of the invention further factors for insuring corrective actions which are gentle and firm and free of hunting conditions which would demand override by the controller, which in the case illustrated would be the pilot of the aircraft in which the control system is embodied. The nature of the invention arrangement is such to insure a maintenance of a close synchronism of the master and slave engines without the need for major control action that would be annoying to the pilot and the passengers of the aircraft.

It is important to note the nature of the hardware involved is such that it will withstand temperature and any vibration that a related engine can tolerate.

A feature of the governor of the invention lies in the positioning of the governor control coils in close proximity with the peripheral travel of the rotating flyweights. This assures a maximum magnetic coupling. It also damps the movement of and produces an improved stability in the flyweight action. The result is a more constant and smoother control of the hydraulic pilot valve which controls the related propeller. Also the present system is such that a change in position of an aircraft in flight will exert no adverse effect on the operation thereof due to gravitational pull. Any change in the aircraft attitude will not in any way affect the synchronizing operation of the system components.

While the drawings do show additional circuitry to enable a pilot to switch the synchronizing system of the invention on or off or to otherwise override the computer amplifier portion of the system, such is illustrated only to indicate the versatility in use of the control system of the invention and as a necessity dictated by existing requirements for safety factors in aircraft controls. However, such additional material is not here discussed since in and of itself it forms no part of the basic invention claimed in the present application.

The invention, apart from the unique system concept described, provides several basic areas of improvement in the art. Improvements exist in its signalling means, its amplifier and its governor structure, independently of the combination thereof.

While the disclosure has been made specific to engines employed in propeller driven aircraft, it will be obvious aspects of the disclosed invention and other embodiments thereof will have significance for use in other applications. It has been emphasized, as has been seen, the detail of the hydraulic servo which may be employed to control the pitch of the propeller blade driven by the slave engine in the example illustrated and the hydraulic circuit required to this end, embodying the valve rod 21, has not been described other than generally since the same may be of a conventional nature and can be provided by anyone versed in the art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for use in correcting speed and/or phase differences between a master engine and at least one slave engine characterized by means for connection to said master and said slave engines operative to sense and continuously compare the speed and phase relation thereof comprising means producing an output signal corresponding to any difference in the speed and/or phase relation of said master and said slave engines, in the operation thereof, said last named means including means effective to produce said signal in a modulated form in the event that the difference in the speed or out-of-phase relation of said engines is below a predetermined level, and means for receiving and directing said signal in a form applicable to induce the correction necessary to eliminate the indicated speed and/or phase difference in the operation of said engines.

2. Apparatus as in claim 1 characterized by said receiving means including a circuit having at least two channels one of which is operative to receive and route therethrough only those signals indicative of overspeed of said slave engine and the other of which is operative to receive and route therethrough only those signals which are indicative of underspeed of said slave engine.

3. Apparatus as set forth in claim 2 characterized by said receiving means including means which evaluate the level of signals received in said channels and route them accordingly.

4. Apparatus as set forth in claim 2 characterized in that said receiving means includes speed servo means and phase servo means which are operatively connected to receive a signal transmitted through one of said channels by way of means providing that the phase servo means and speed servo means mutually or singly respond in accordance with the nature and/or level of the signal.

5. Apparatus as set forth in claim 1 characterized by said receiving means including a circuit embodying at least two channels for transmitting said signal, one of which two channels is adapted to receive signals indicative of an overspeed relation and the other of which is adapted to receive signals indicative of an underspeed relation of said slave engine with respect to said master engine and means embodied in said receiving means in connection with said channels operative on receipt of a first said signal to block the passage of potentially interfering signals through said channels until the speed and/or phase difference indicated by said first signal is corrected.

6. Apparatus as set forth in claim 1 characterized in that said receiving means includes a circuit embodying a plurality of channels each of which is arranged to selectively accept a particular type of said signal and to reject others, and in that speed servo means and phase servo means are provided in connection with said channels to singly or plurally receive and further direct the signal received in accordance with and dependent on the nature and level of the signal.

7. Apparatus as in claim 6 characterized by means interposed between said channels and said speed servo means to block the flow of a signal to said speed servo means which is representative of a difference in speed between said slave engine and said master engine which is below a predetermined level, means providing for the routing of the signal so blocked to operate said phase servo means and means utilizing the action of said speed servo means and/or said phase servo means to produce an output signal capable of initiating a corrective action in correspondence with the level of the signal which is transmitted through one of said channels.

8. Apparatus as in claim 1 characterized by said means for connection to said master and said slave engines including a timing generator embodying shaft means for connection with and drive by said master engine, which shaft means mounts a slip ring having conductive and non-conductive portions, brushes having a circumferentially spaced contacting relation with the conductive portion of said slip ring one of which connects to a source of power and the other of which is connected to a pair of brushes in circumferentially spaced contact with a conductive portion of a second slip ring driven by further shaft means adapted for connection with and drive by said slave engine, said second slip ring including a segment of its outer periphery made of non-conductive material having normally in contact therewith a further pair of circumferentially spaced brushes which on contact thereof by a conductive portion of said second slip ring will selectively transmit an appropriate signal of an underspeed or overspeed and/or out-of-phase operation if said slave engine with reference to said master engine, said receiving means being characterized by a circuit having at least two channels one of which is operative to receive and route therethrough only signals indicative of overspeed of said slave engine and the other of which is operative to receive and route therethrough only signals indicative of underspeed of said slave engine and said further brushes in contact with said second slip ring being respectively connected to one of said channels.

9. Apparatus as in claim 8 characterized in that said second slip ring includes circumferentially spaced conductive portions bridged by means providing that signals of differences in speed and/or phase relation of said engines, in the operation thereof, which are below a predetermined level will be modulated in the production thereof.

10. Apparatus as set forth in claim 1 characterized in that said means for receiving and directing said signal has in connection with the output portion thereof a governor incorporating magnetic biasing means having in operative connection therewith means for eliminating the indicated speed and/or phase difference in the operation of said engines, in correspondence with the form of the signal appearing at the output of said receiving means.

11. Apparatus as in claim 10 characterized in that means are provided to establish a reference current value in said magnetic biasing means, which current value is changed in correspondence with the nature and level of the signal transmitted to said magnetic biasing means by way of said receiving means.

12. Apparatus as in claim 11 characterized by said means in operative connection with said magnetic biasing means including valve means within said governor, which valve means are adapted for operative connection to said slave engine and so as to be placed in a null position in correspondence with a synchronized condition or operation of said master and said slave engines, flyweight means in said governor arranged for operative connection with said slave engine and to rotate in correspondence with the condition of operation thereof, said flyweight means being simultaneously in operative connection with said valve means and said magnetic biasing means to normally balance in correspondence with the said null position of said valve means when said engines are operating in a synchronized condition, and said flyweight means being oriented to have tip portions thereof adjacent said magnetic biasing means and arranged to respond to a change in the current value of said magnetic biasing means to adjust said valve means, which are conditioned thereby to apply the necessary influence to produce a correction of an out-of-synchronized condition of said slave engine with reference to said master engine.

13. Apparatus as set forth in claim 1 characterized by said receiving means including means for selectively routing said signal through said receiving means, in accordance with the nature of the necessary correction indicated thereby, to an output portion thereof by way of means functioning to block interfering signals.

14. Apparatus for use in correcting speed differences between, and/or an out-of-phase relation of, a master engine and a slave engine characterized by means for connection to said master and said slave engines operative to sense and continually compare the speed and phase relation thereof comprising means for producing an output signal corresponding to any difference in their speed and/or an out-of-phase relation thereof, and means for receiving and directing said signal in a form applicable to induce the correction necessary to eliminate the indicated speed difference and/or out-of-phase operation of said engines, said receiving means including a circuit embodying a plurality of channels each of which is arranged to selectively accept a particular type of said signal and reject others.

15. Apparatus as in claim 14 wherein said plurality of channels include two channels one of which is operative to receive and route therethrough only those signals indicative of overspeed of said slave engine and the other of which is operative to receive and route therethrough only those signals which are indicative of underspeed of said slave engine.

16. Apparatus as in claim 14 wherein said receiving and directing means incorporates means functioning on receipt of a first signal accepted by one of said channels to block interfering signals from passage through said channels until said first signal is routed through and from said receiving and directing means to effect a correction of the out-of-synchronized condition of said engines represented by said first signal.

17. Apparatus as set forth in claim 14 characterized in that said receiving and directing means includes speed servo means and phase servo means in connection with said channels providing that said servo means singly or plurally receive and further direct the signal received in accordance with and dependent on the nature and level of said signal.

18. Apparatus as in claim 15 wherein said means for connection to said master engine and said slave engine comprise a timing generator including shaft means adapted for connection with said master engine and drive thereby, said shaft means mounting a slip ring, said slip ring including a conductive portion having in bearing circularly spaced contact therewith a pair of brushes one of which is adapted for connection with a source of power, the position of said slip ring with reference to said brushes being indicative of the output speed of said master engine, the other of said pair of brushes being electrically connected with a second pair of brushes, a second slip ring including conductive and non-conductive segments in the circular extent thereof, said second pair of brushes being in continuous bearing contact with a conductive segment of said second slip ring, a third pair of brushes normally, upon a synchronized condition of said master and slave engines, being engaged in a bearing contact with a non-conductive portion of said second slip ring, said second slip ring being adapted to move circularly with reference to said third pair of brushes in response to an underspeed, overspeed or out-of-phase condition of said slave engine with reference to said master engine to provide that a portion of a conductive segment thereof is brought into contact with one of said third pair of brushes, whereupon to produce a resulting signal which is in direct correspondence with and representative of the overspeed or underspeed and/or out-of-phase condition of said slave engine with reference to said master engine.

19. Apparatus as in claim 18 characterized in that the conductive segment of said second slip ring which is continuously engaged by said second pair of brushes is a first arcuate segment thereof the extent of which is greater than 180° and in that said second slip ring includes further conductive segments which are circumferentially spaced from each of the respective ends of said first arcuate segment and separated therefrom by non-conductive segments of said second slip ring and from each other by a further non-conductive segment of said second slip ring, said first arcuate segment and the adjacent end spaced further conductive segments of said second slip ring being bridged by conductive means to provide that the engagement of one of said third pair of brushes with one of said further conductive segments will produce an output signal which is modulated to indicate a low level of overspeed or underspeed and/or out-of-phase condition of said slave engine with respect to said master engine.

20. Apparatus for detecting an out-of-synchronized condition of a master engine and a slave engine comprising a timing generator including shaft means adapted for connection with the master engine and drive thereby, said shaft means mounting a slip ring including a conductive portion having in bearing contact therewith a pair of circularly spaced brushes one of which is adapted for connection to a source of power, the position of said conductive portion with reference to said brushes corresponding to the output speed of said master engine, the other of said brushes being electrically connected to a second pair of brushes, a second slip ring including conductive and non-conductive segments having a conductive segment thereof in continuous bearing contact with said second pair of brushes, a third pair of brushes normally, in a synchronized condition of said master and slave engines, being in contact with a non-conductive segment of said second slip ring, said second slip ring mounting to shaft means adapted to be connected with and driven by said slave engine, said second slip ring being adapted, on the occurrence of an overspeed or underspeed and/or out-of-phase relation of said slave engine with reference to said master engine, in accordance with the degree thereof, to move with reference to said third pair of brushes to cause an appropriate conductive segment thereof to come into contact with one of said third pair of brushes, producing an output signal by way thereof which is directly representative of the nature and degree of the overspeed or underspeed and/or out-of-phase condition of said slave engine with reference to said master engine.

21. Apparatus as in claim 20 wherein said conductive segment of said second slip ring in continuous bearing contact with said second pair of brushes is a segment thereof the arcuate extent of which is greater than 180° and said second slip ring includes further conductive segments which are circumferentially spaced beyond each of the respective ends of said first arcuate segment and separated therefrom by non-conductive segments of said second slip ring and from each other by a further non-conductive segment of said second slip ring, said first arcuate segment and the adjacent end spaced further conductive segments of said second slip ring being bridged by conductive means to provide that the engagement of one of said third brushes with one of said further conductive segments will produce an output signal which is modulated to be indicative of a low level of overspeed or underspeed and/or out-of-phase condition of said slave engine with reference to said master engine.

* * * * *